March 15, 1966          J. C. SADLER          3,240,370
VEHICLE HAULAGE BODY AND LOAD EJECTOR MECHANISM
Filed Feb. 3, 1964          9 Sheets-Sheet 3
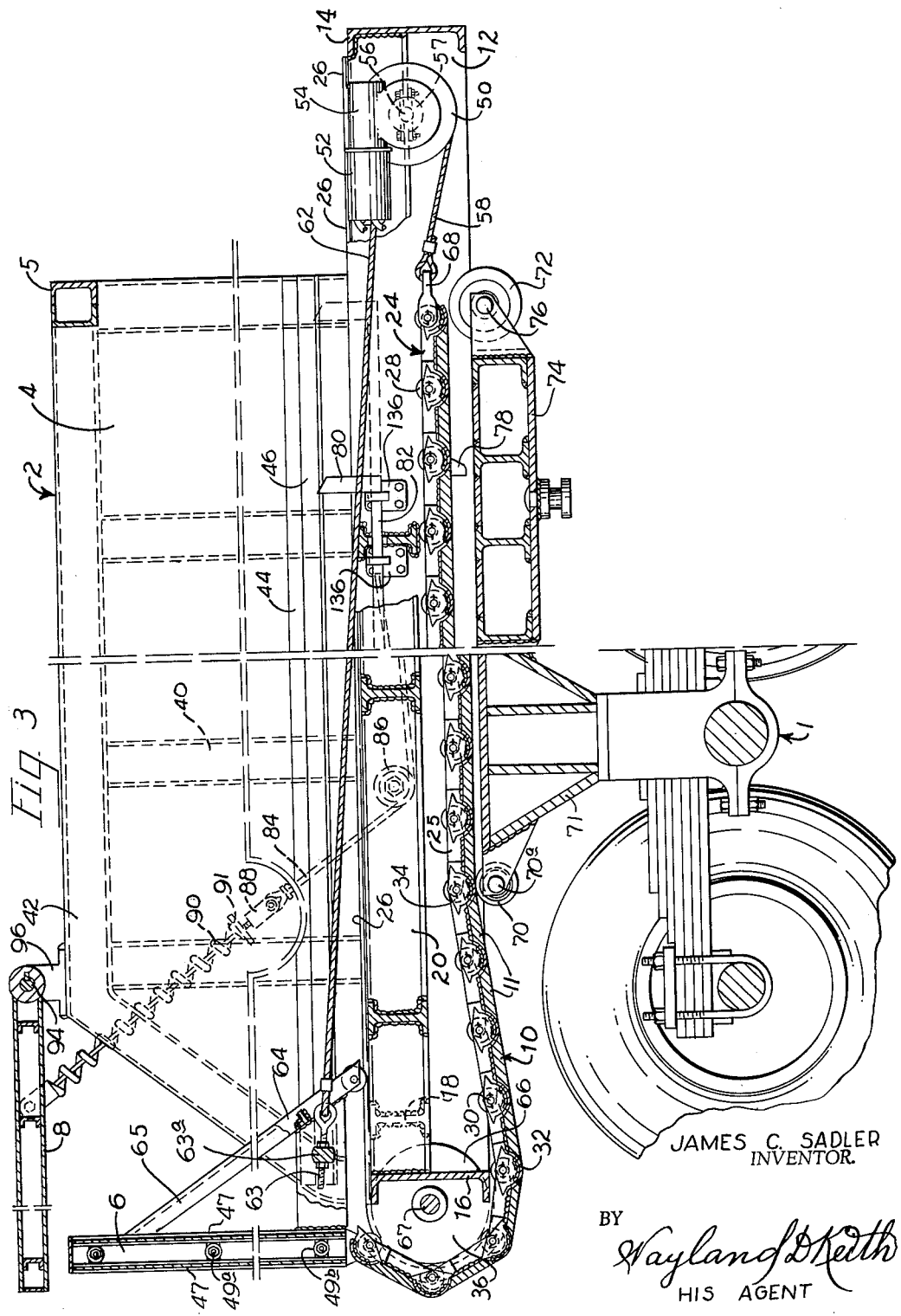
JAMES C. SADLER
INVENTOR.
BY
*Wayland D. Keith*
HIS AGENT March 15, 1966  J. C. SADLER  3,240,370
VEHICLE HAULAGE BODY AND LOAD EJECTOR MECHANISM
Filed Feb. 3, 1964  9 Sheets-Sheet 4
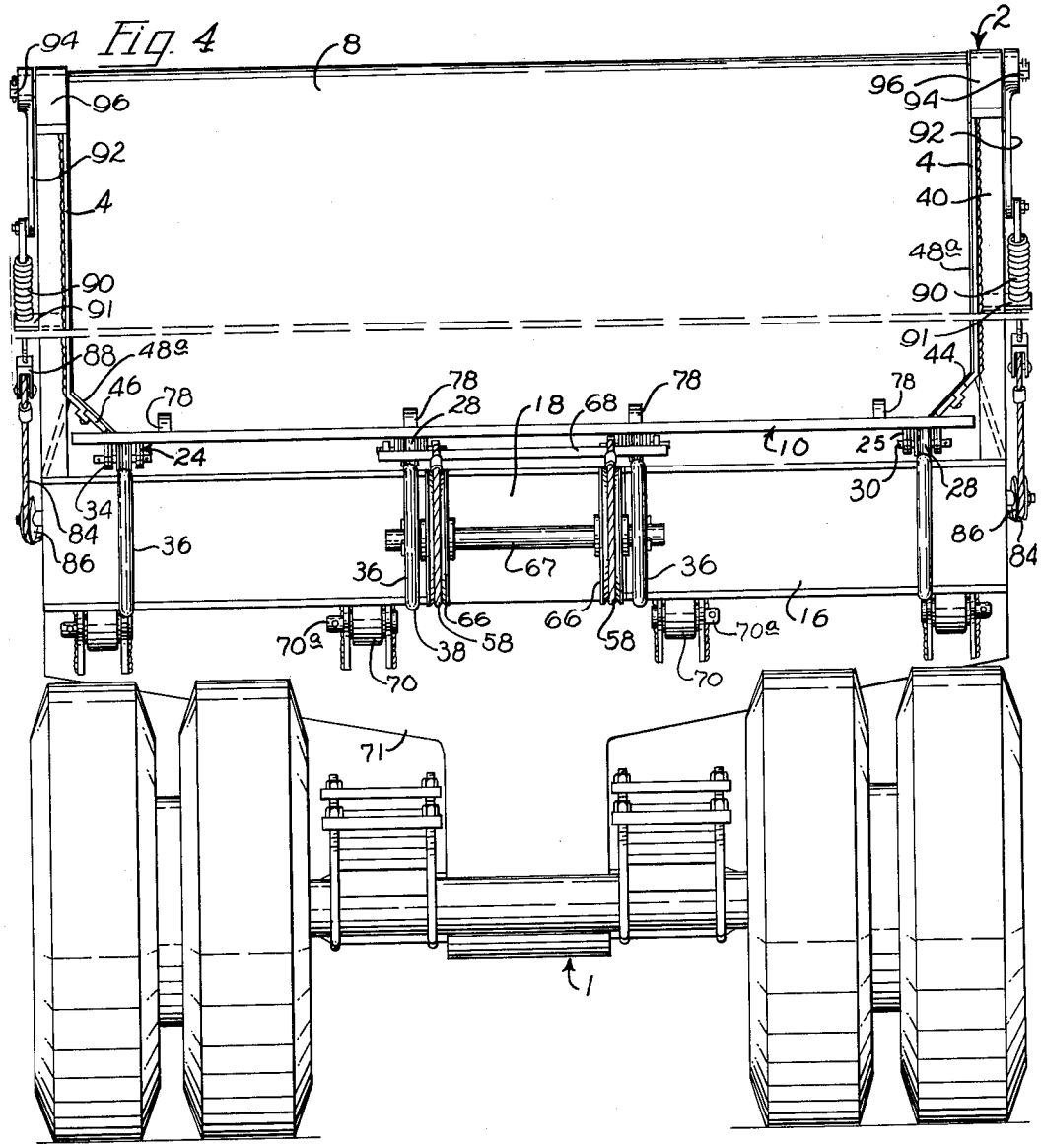
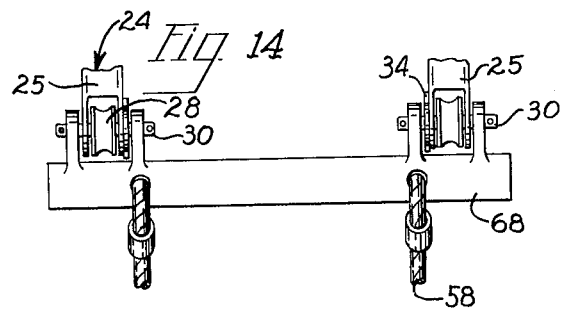
JAMES C. SADLER
INVENTOR.
BY
Wayland D. Keith
HIS AGENT March 15, 1966  J. C. SADLER  3,240,370
VEHICLE HAULAGE BODY AND LOAD EJECTOR MECHANISM
Filed Feb. 3, 1964  9 Sheets-Sheet 5

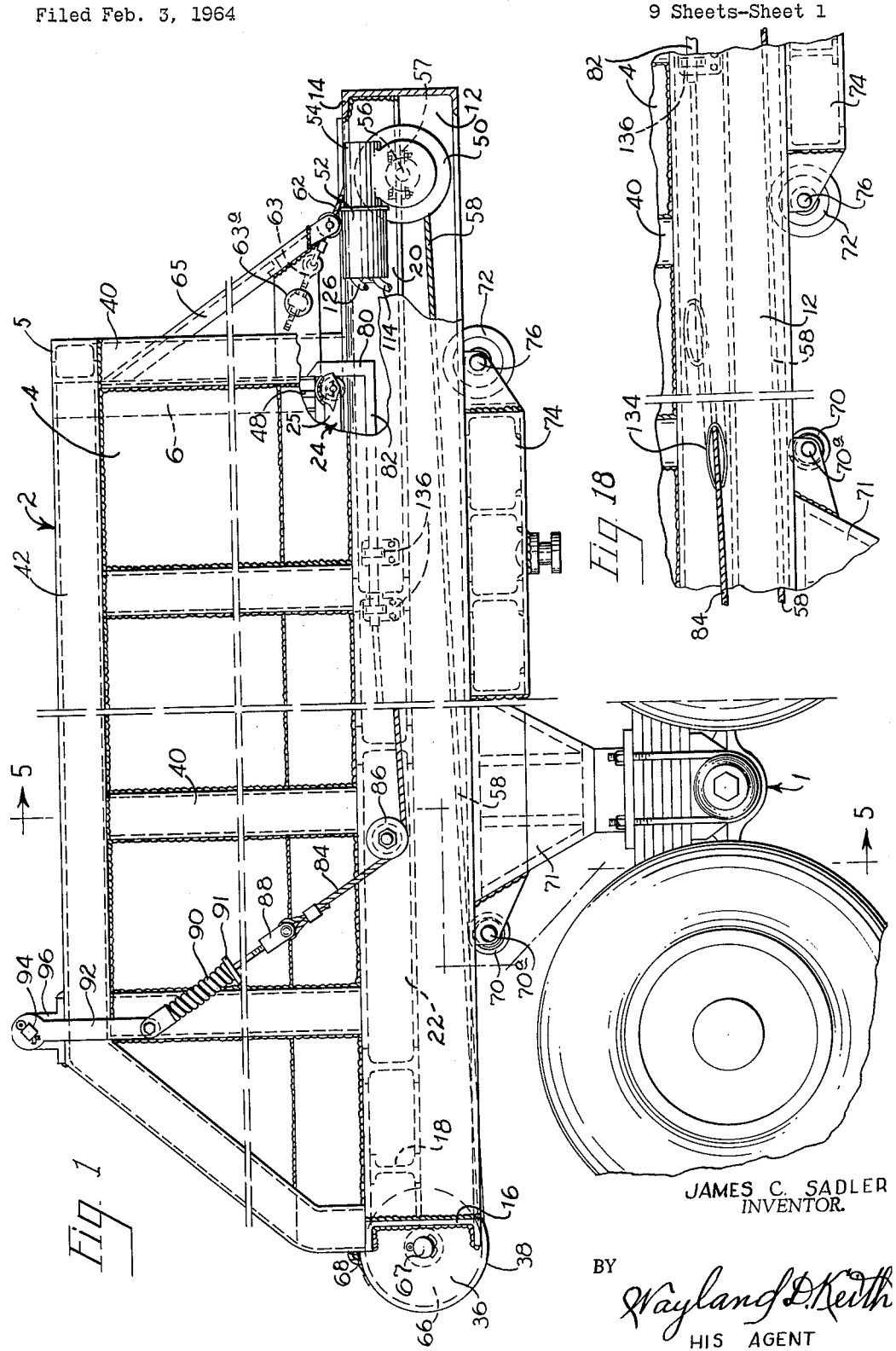

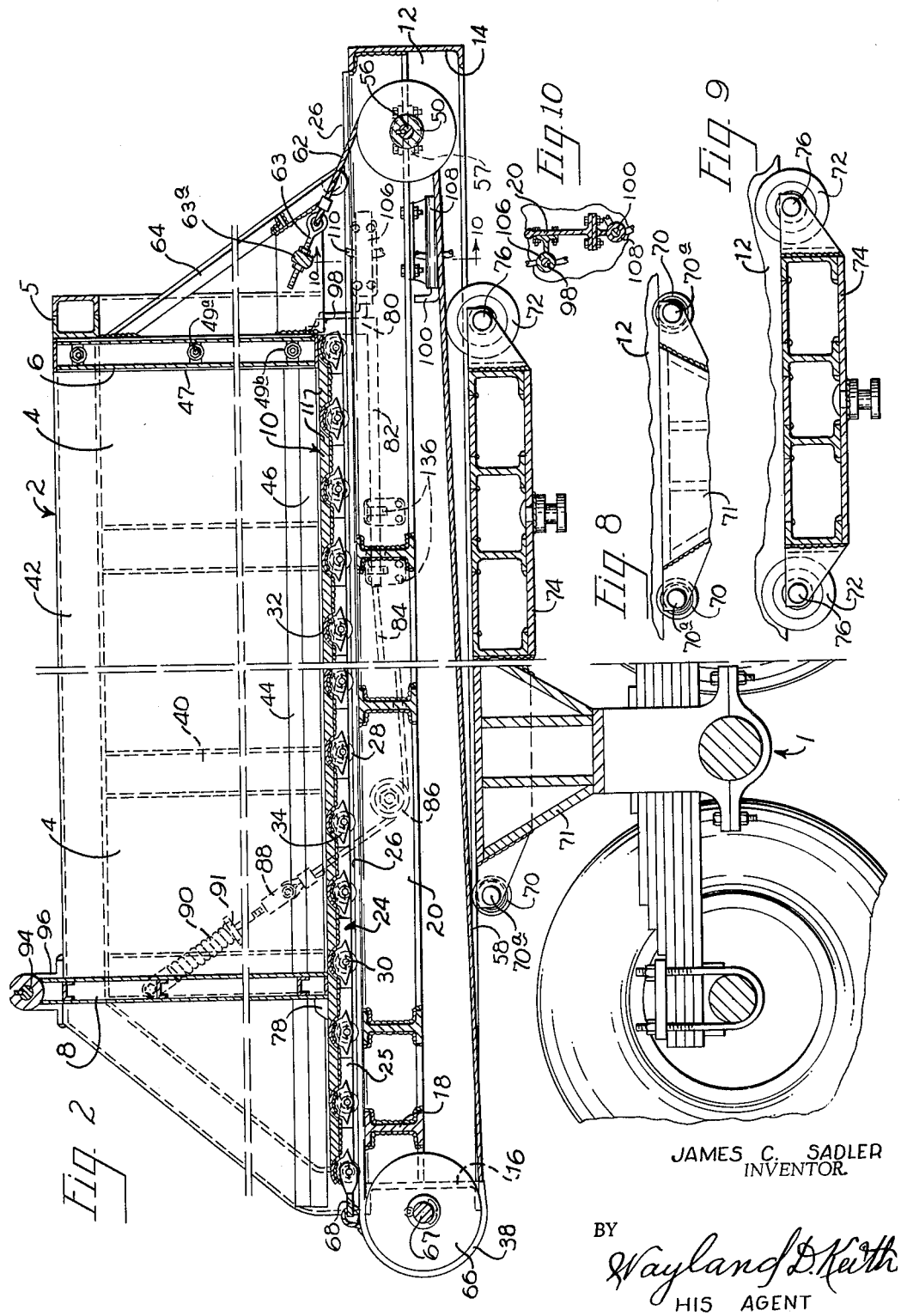

JAMES C. SADLER
INVENTOR.

BY

Wayland D Keith
HIS AGENT

March 15, 1966  J. C. SADLER  3,240,370
VEHICLE HAULAGE BODY AND LOAD EJECTOR MECHANISM
Filed Feb. 3, 1964  9 Sheets-Sheet 6

JAMES C. SADLER
INVENTOR.

BY
Wayland D. Keith
HIS AGENT

March 15, 1966    J. C. SADLER    3,240,370
VEHICLE HAULAGE BODY AND LOAD EJECTOR MECHANISM
Filed Feb. 3, 1964    9 Sheets-Sheet 7

JAMES C. SADLER
INVENTOR.

BY Wayland D Keith
HIS AGENT

March 15, 1966 J. C. SADLER 3,240,370
VEHICLE HAULAGE BODY AND LOAD EJECTOR MECHANISM
Filed Feb. 3, 1964 9 Sheets-Sheet 8
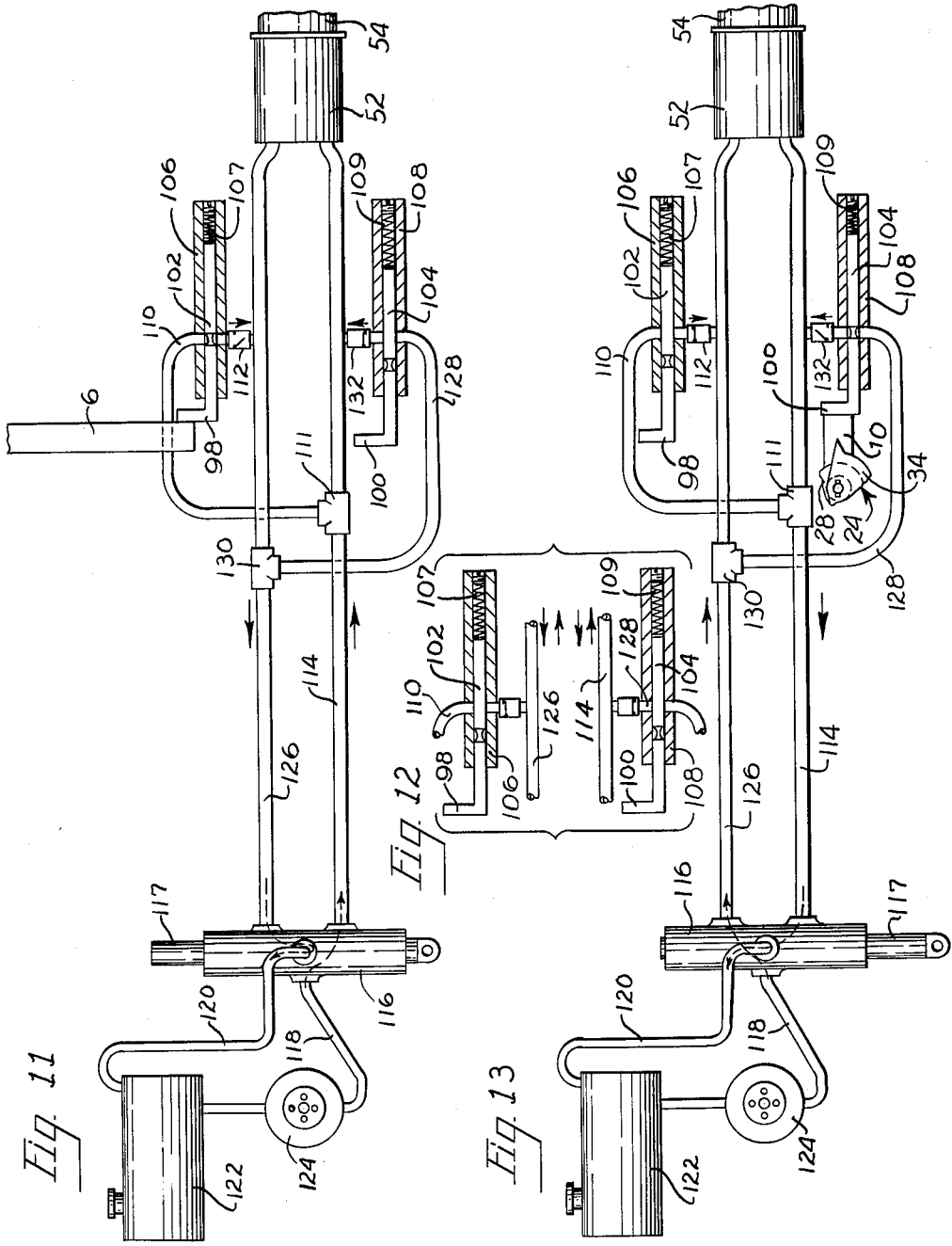
JAMES C. SADLER
INVENTOR.
BY
Wayland D. Keith
HIS AGENT March 15, 1966  J. C. SADLER  3,240,370
VEHICLE HAULAGE BODY AND LOAD EJECTOR MECHANISM
Filed Feb. 3, 1964  9 Sheets-Sheet 9
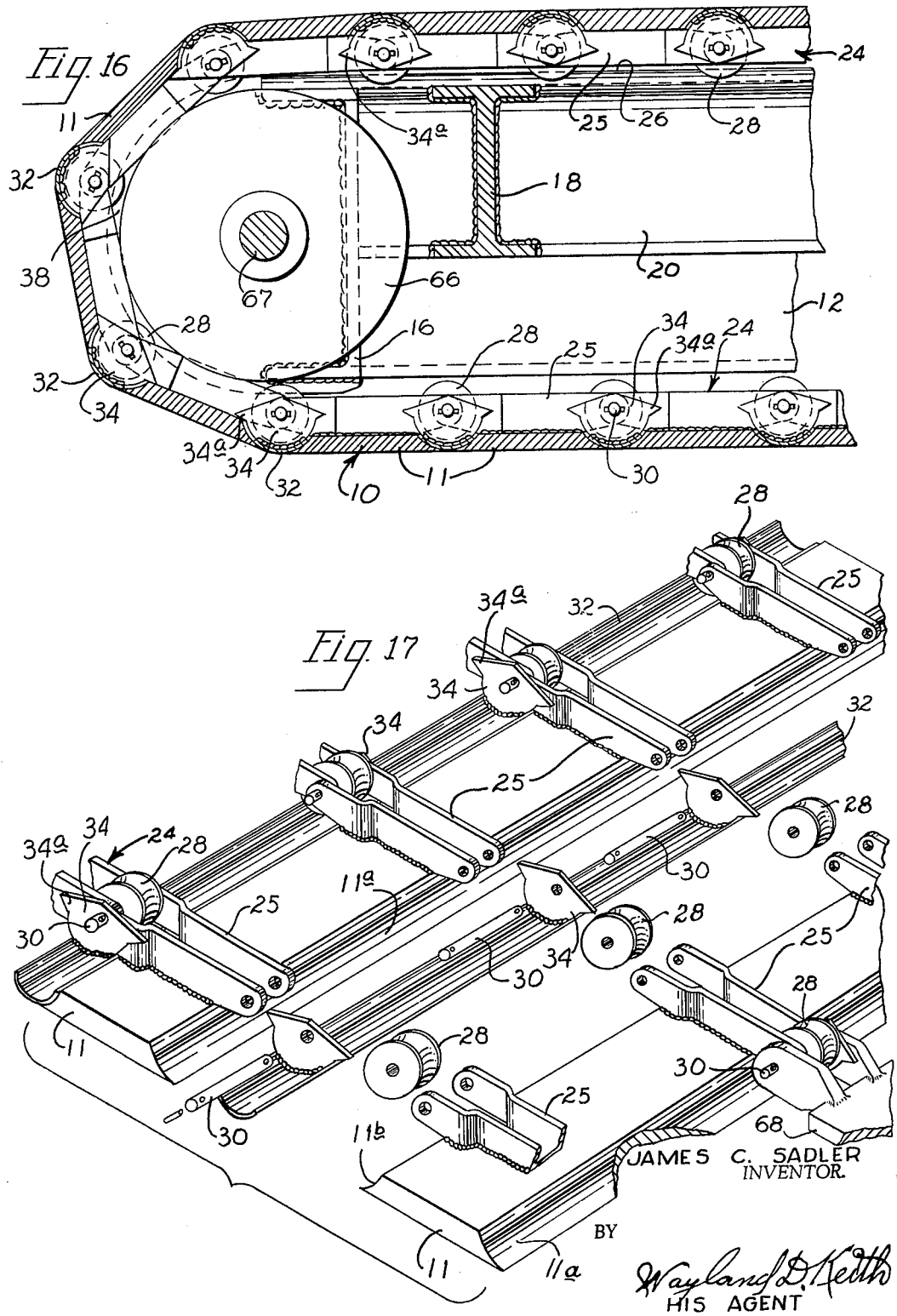
JAMES C. SADLER
INVENTOR.
BY
Wayland D. Keith
HIS AGENT United States Patent Office 3,240,370
Patented Mar. 15, 1966

3,240,370
VEHICLE HAULAGE BODY AND LOAD
EJECTOR MECHANISM
James C. Sadler, P.O. Box 289, Bowie, Tex.
Filed Feb. 3, 1964, Ser. No. 342,195
14 Claims. (Cl. 214—83.18)

This invention relates to vehicle haulage bodies and more particularly to a vehicle haulage body load ejector mechanism.

Various load ejector mechanisms and vehicle haulage bodies have been proposed heretofore for hauling pulverulent, granular, or lump material such as sand, rock, grain, headed maize, ear corn, coal, and the like. However, these for the most part utilized a body which hingeably connected to the vehicle frame at or near the rear end thereof, which required the raising of the front end of the body to a considerable height so that the material in the body, when the rear end gate was open, would flow out by gravity. In certain instances, such as in buildings with low ceilings, it was not possible to elevate the forward end of the vehicle body a sufficient height to enable the dumping of the material therefrom, particularly long vehicle bodies which often were as much as 30 to 40 feet in length and required that the body be elevated either mechanically or hydraulically to great height, which usually moved the wheels forward in such a manner that if the vehicle were not on relatively level terrain, the center of gravity of the elevated body would shift to such extent as to cause the vehicle body to turn over with resultant damage thereto and to the contents and possible injury or death to the operator of the vehicle.

Furthermore, vehicles of the character requiring elevation often have packed or tenacious material therein which does not readily flow by gravity from the vehicle body, even when the body attains its maximum angular pitch for unloading. Furthermore, with such material, during the unloading, as by dumping, the material was not readily spread to a uniform thickness over the terrain as the truck was moved therealong, as usually when the load "slipped" most of the material was unloaded in a heap, whether it be from a four cubic yard body or from a thirty cubic yard body. This usually required that the material be spread over a wide area to a uniform thickness, which meant much extra work, either manually or by machine.

In the present device the body of the vehicle and the ejector mechanism therefor is so constructed that the entire load of pulverulent material, earth, granular material, grain, rock, coal, or the like may be discharged within a building, tunnel, or other place having limited headroom, if the vehicle body can be moved into the area. The material may be discharged in a single heap, if desired, or it can be discharged in a graduated amount as the vehicle moves along the terrain, thereby saving considerable labor, or machine work in the event the material is to be spread.

Furthermore, the discharge of the material from the vehicle body is such that the vehicle may be maintained stable at all times and even unloaded or inclines to either side of the vehicle body, or upward on an inclined terrain, without danger to life or property. The construction of the present device enables the load to be readily unloaded under adverse conditions, such as the load consisting of packed or sticky material, large lumps such as rocks, coal, or the like.

An object of the invention is to provide a vehicle body and ejector mechanism therefor which will readily unload pulverulent, granular, or lumpy material, uniformly either as the vehicle stands still or while it is moving.

Another object of the invention is to provide a vehicle body and ejector mechanism therefor wherein provision is made for moving the floor of the vehicle and the ejector wall simultaneously so as to discharge the load of material therefrom with a minimum of friction between the vehicle body and the material being ejected.

Another object of the invention is to provide a vehicle body whereby the floor carrying the load of material to be ejected may be selectively moved together with an ejector wall of the vehicle so as to vary the discharge of material ejected.

Another object of the invention is to provide a hydraulically actuated mechanism for moving the ejector mechanism within the vehicle body so as to selectively move the ejector mechanism and material therein by remote control.

Still a further object of the invention is to provide automatic controls for limiting the movement of the movable floor and ejector wall or end gate in either direction.

Yet another object of the invention is to provide a mechanism for automatically opening the rear end gate upon the starting of the ejector mechanism and for automatically closing and securing the end gate firmly in place when the ejection of the material has been completed, and the ejection wall or end gate and floor has returned to substantially normal position for loading.

Still a further object of the invention is to provide a roller mounted floor for the ejection mechanism, which will support the material being ejected for rolling movement, upon the actuation of remotely controlled actuating device.

Another object of the invention is to provide, in a vehicle body, a hydraulically movable ejector mechanism and movable floor, whereby the vehicle body increases progressively in width toward the terminal end thereof.

Still another object of the invention is to provide a movable floor for supporting material thereon, which floor defines a relatively flat horizontal plane when in loading position and which is sealed against normal leakage of granular material when loaded.

Still another object of the invention is to provide a hydraulically actuated winching mechanism which will move the floor and ejector wall or front end gate of the vehicle in either direction, and which mechanism may be readily adjusted to compensate for wear or stretching of cables.

Still another object of the invention is to provide a vehicle body having a movable floor therein, which floor is so designed as to provide rails to support guide rollers thereon for movement of the floor therealong.

Still another object of the invention is to provide an ejector wall or gate that is expansible and which will conform to the width of the body as the body increases in width towards the terminal or dumping end thereof, and which gate will conform to the width of the body as the gate is moved toward the forward end thereof.

Another object of the invention is to provide elastomer sealing means to provide a seal between the stationary portion of the body and the movable portion of the body.

A still further object of the invention is to provide a movable floor for a vehicle body whereby chain like members are secured thereto in such manner as to support the floor on spaced apart track members, which track members are on rollers for movement therealong, and whereby an arcuate sealing member is provided intermediate the flooring members in such manner as to seal the gap therebetween at all times.

With these objects in mind and others which will become manifest as the description proceeds, reference is to be had to the accompanying drawings in which like reference characters designate like parts in the several views thereof, in which:

FIG. 1 is a fragmentary, side elevational view of a haulage vehicle in the form of a tandem trailer, which embodies the present body structure with the load ejector mechanism therein, with parts being broken away and shortened, and with parts shown in section to bring out the details of construction;

FIG. 2 is a longitudinal, sectional view taken approximately on line 2—2 of FIG. 7, looking in the direction indicated by the arrows;

FIG. 3 is a view similar to FIG. 2, but taken on line 3—3 of FIG. 7, showing the floor and the ejector wall mechanism in the remote position from that shown in FIG. 2;

FIG. 4 is a rear end elevational view of the vehicle with the body ejector mechanism mounted thereon, as embodied in the present invention;

FIG. 8 is a fragmentary view of a portion of the vehicle body showing the vehicle floor support members mounted thereunder;

FIG. 9 is a fragmentary, sectional view through a portion of the vehicle body on the lower side thereof, showing the support rollers for supporting the movable floor when the floor is in unloaded position;

FIG. 10 is a sectional view taken on line 10—10 of FIG. 2, looking in the direction indicated by the arrows;

Figure 15:
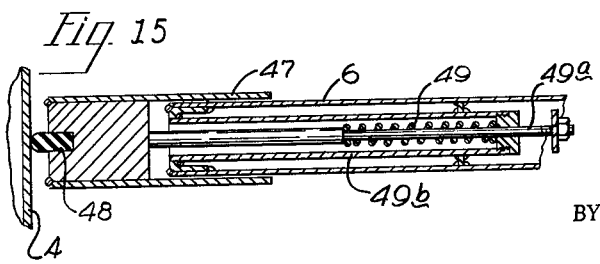
Figure 6:
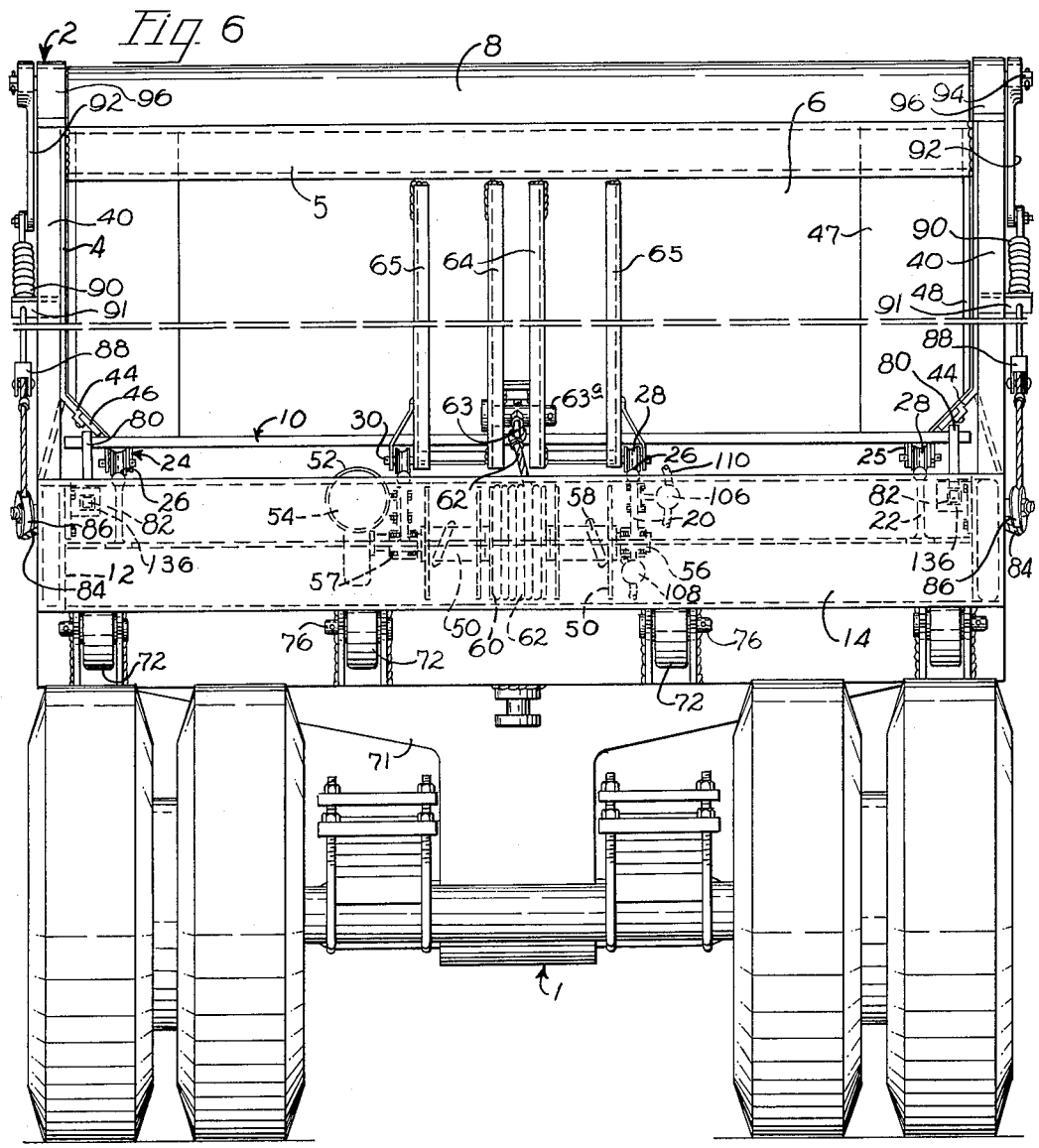
FIG. 6 is a front end elevational view of a vehicle having the body and ejector mechanism mounted thereon, which forms the present invention.

FIG. 11 is a diagrammatic view of the hydraulic piping and valve system and the automatic stop means for controlling the movable floor and movable wall or end gate of the load ejector mechanism when the load ejector mechanism has returned to load position, and showing the path of fluid when the load ejector end gate is moved into this position, with the arrow showing the direction of flow of fluid through the piping system;

FIG. 12 is a fragmentary view of the piping system such as shown in FIG. 11, but with the by-pass valves in closed position to direct hydraulic fluid to the hydraulic motor;

FIG. 13 is a view similar to FIG. 11, but showing the valve in reversed position to that shown in FIG. 11, to stop the travel of the moving floor when ejection is completed;

FIG. 14 is an enlarged, fragmentary, top plan view of the draw bar for moving the load ejector mechanism for ejecting a load of material, with a portion of the ejector cables attached thereto, and showing the support rollers and a fragmentary portion of links mounted thereon;

FIG. 15 is an enlarged, fragmentary, sectional view of a portion of the ejector wall or movable end gate and a portion of the vehicle body, and showing the expansible sealing members therebetween;

FIG. 16 is an enlarged, fragmentary, longitudinal, sectional view through the rear portion of the vehicle body and movable floor to show the manner of construction thereof;

FIG. 17 is a fragmentary perspective view of the under side of the movable floor, with parts broken away and with parts exploded to bring out the details of construction; and FIG. 18 is a fragmentary elevational view of an intermediate portion of the side frame member of the vehicle body, such as a trailer body, showing the manner of passing the end gate actuating cable into and through the side frame member, with parts broken away and shortened to bring out the details of construction.

With more detailed reference to the drawings, the numeral 1 designates generally a haulage vehicle, such as a trailer, truck, or the like, having a body designated generally by the numeral 2 thereon. In the present instance the body takes the form of a dump body for hauling bulk granular or lumpy material, such as sand, gravel, rocks, grain, ear corn, coal, or other materials of a character that may be readily hauled in bulk and removed by ejection in a manner more fully brought out hereinafter.

The present body 2 is constructed on the vehicle chassis and has upstanding side walls 4 with a rearward movable end gate or push gate 6 and a rear swinging end gate 8. A sectional floor 10 extends between the rearward movable end gate or push gate 6 and the rear end of the vehicle body 2, which floor 10 is of such construction to offer a substantially plane upper surface, with the sections being sealed therebetween and at the ends thereof so as to enable the hauling of granular or pulverulent material or material of larger pieces such as rock, corn, and the like.

The vehicle frame 1 has side frame members 12 and a forward end member 14. The rear of the vehicle frame 1 has an end member 16 extending partially thereacross and a further end member 18 abridging between longitudinally positioned track members 20—20. Further track members 22 are spaced outward from the respective track members 20 so as to form longitudinal, parallel support members for supporting roller chain 24 and movable floor 10. The track members 20 and 22 each has a rounded surface, as indicated at 26, to complementally receive concave rollers 28, which rollers are mounted on axles 30, which axles 30 pivotally join the links 25 of chain 24, as will best be seen in FIG. 17. The links 25 are composed of U-shaped members having outstanding sides and are so formed that the ends will interfit together and receive the roller 28 therebetween. An arcuate sealing member 32 is mounted between sections 11 of floor 10 so that the arcuate portion of the sides of the floor sections 11 will fit in sealed relation with the convex surface of the arcuate sealing member 32. The arcuate sealing member 32 has spaced apart, outwardly extending lugs 34 thereon so as to maintain the sealing member 32 in fixed relation with respect to the sections 11 of the floor 10. The shape of the lugs 34 permits limited rotary movement of arcuate sealing member 32 about the axis of axles 30 to permit the chain 24 to pass over curved end plates 36 as the rollers 28 roll around arcuate track 38. The lugs 34, on arcuate sealing member 32, are of such construction as to limit the arcuate movement of the sealing member 32 with respect to floor sections 11. The floor 10 is positioned on roller mounted chains 24 on track members 20 and 22, which floor 10 extends out beneath side walls 4 within the confines of uprights 40, which form vertical braces between the side frame members 12 and an upper channel body brace member 42.

The lower ends of the side walls 4 have inwardly extending portions 44 which extend to a point immediately above the movable floor 10, with a sealing gasket 46 secured to each of the side walls 4 as by rivets, screws, or the like, so that the sealing gaskets 46 will be in bearing relation with the side frame as the movable floor 10 moves thereunder, thereby forming a seal against loss of material within the confines of the body 2.

The forward end gate or push gate 6 is secured to the forward end of the movable floor 10 and serves as a moving wall or a push gate to move the granular material or the like rearwardly of the body 2 when it is desired to dump the material from the body. However, since the present form of arrangement is particularly adaptable for use with trailer type vehicles, such as tandem semi-trailers, the length of the floor often attains thirty or more feet and supports many tons of material, which must be removed without elevating the forward end of the body. The forward end gate or push gate 6 has sliding guides 47 and a sealing gasket 48 on each end thereof, which sealing gaskets 48 are spring pressed by springs 49 to urge the seals or wipers into engagement with the body 2 as the moving floor 10 and forward end gate or push gate 6 move rearward, as will be more fully set out hereinafter. The rear end gate 8 has a sealing gasket 48a on each side thereof, adjacent the side walls 4, to form a seal between the respective ends of the end gate 8 and the respective side walls.

Figure 5:
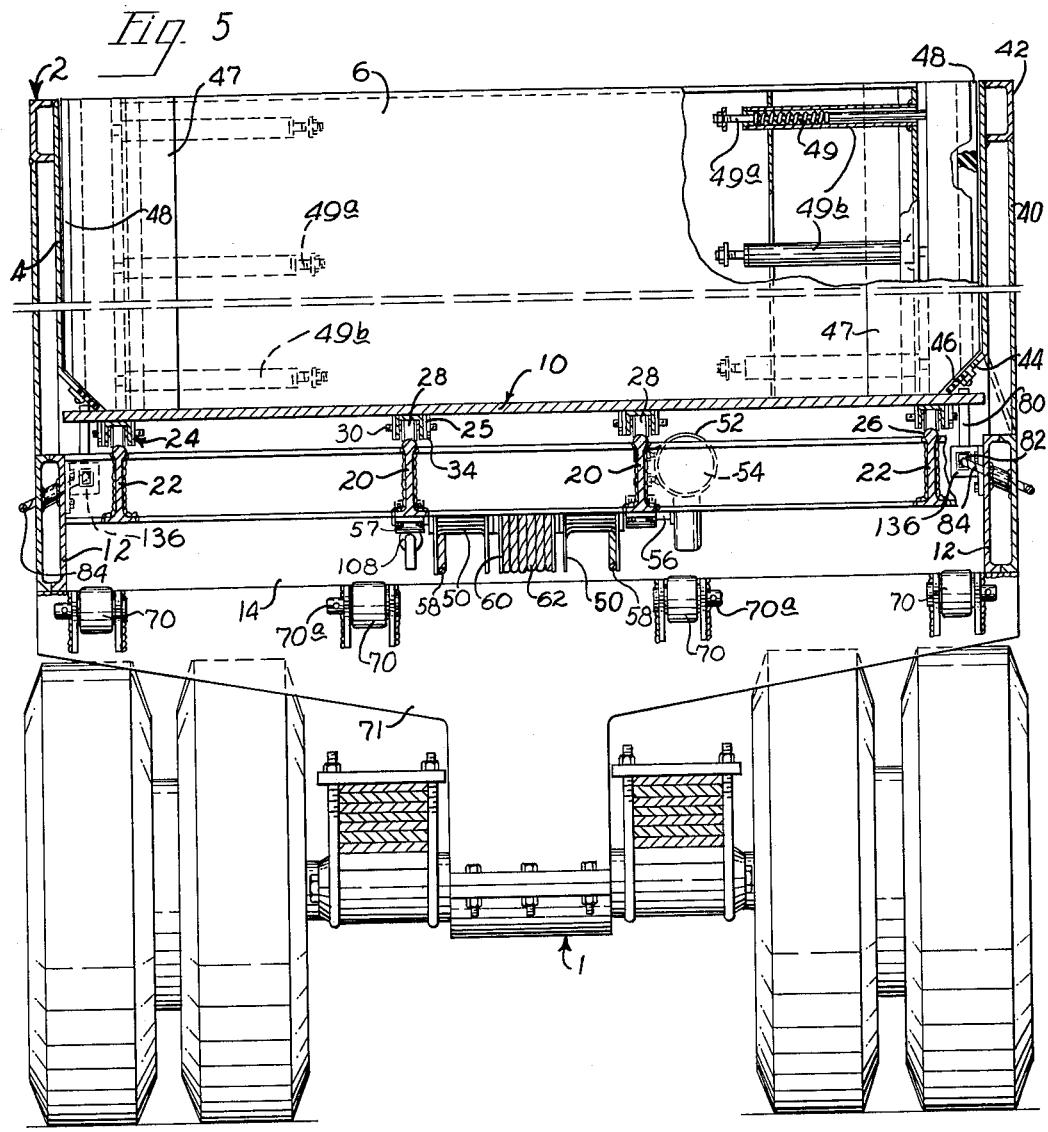
FIG. 5 is a sectional view taken on line 5—5 of FIG. 1, looking in the direction indicated by the arrows.

The rear end gate 8 is so connected with the mechanism that moves the forward end gate or push gate 6 rearward, that it will automatically be opened upon predetermined rearward movement of the forward end gate or push gate 6. The wiper elements of forward end gate or push gate 6 are more fully disclosed in FIGS. 5, 7 and 15, which elements enable the forward end gate or push gate 6 to be moved rearward along a vehicle haulage body 2 with outwardly and rearwardly diverging side walls 4 so as to minimize the friction upon ejection of the load of granular material or the like.

The floor 10 may be moved rearwardly and forwardly by one of several sources of power, however, in the present instance, winches 50 are mounted on and are secured to shaft 56, which shaft 56 is journalled on the lower side of track members 20—20 and which winches 50 are mounted on the forward end of the vehicle frame 1 and may be powered by a motor 52 which drives through a gear reduction unit 54 to rotate shaft 56 in either direction, either to reel the cables 58 thereonto or reel off the cable, depending upon the direction the floor 10 is to be moved. In the present instance, the motor 52 is shown to be a reversible type hydraulic motor. A winch drum 60 is mounted on shaft 56 and is secured thereto for rotation therewith, so upon winding cables 58 onto winches 50, cable 62 on winch drum 60 is payed out, as the cable 62 is connected to a pin 63a on frame 64 on the forward face of forward end gate or push gate 6.

The cables 58 extend from winches 50 to the rear of vehicle frame 1 and over sheaves 66 to connect to a transverse bar or draw bar 68 which is pivotally connected to the chain 24, on which floor sections 11 are secured. The rollers 28 are adapted to roll off the rounded surface 26 of track members 20 and 22 and onto arcuate track 38 on curved end plates 36 and thence beneath the longitudinal track members 20 and 22, and are supported on rollers 70 and 72 in rolling relation, as will best be seen in FIG. 3. The rollers 70 are spaced apart transversely of the vehicle frame 1 and are mounted on frame 71 in journaled relation on axle pins 70a. It is preferable to have these rollers rubber faced to lessen the abrasive action thereon. Likewise, rollers 72 are mounted on a frame 74 in spaced apart relation and journaled on axle pins 76. It is also preferable that these rollers be rubber faced. By having these transversely spaced apart rollers, the floor 10 may be supported substantially within the confines of side frame members 12 when the forward end gate or push gate 6 has reached the rearmost position to eject the load of material from body 2 by the pull of cables 58. As the cables 58 move the floor 10 from the position shown in FIGS. 2 and 7 into the position shown in FIG. 3, the cable 62 is unwound from which drum 60, with the cables 58 and 62 remaining relatively taut at all times. The tautness of cable 62 is adjusted by a screw threaded eye bolt 63 which passes through a transverse pin 63a, which pin extends between bars on frame 64, which bars are secured to the front face of forward end gate or push gate 6, which bars are spaced apart, as will be seen in FIG. 7, and are braced by angle members to forward end gate or push gate 6. With the cable 62 in adjusted condition this automatically adjusts cables 58 to the correct tightness.

Figure 7:
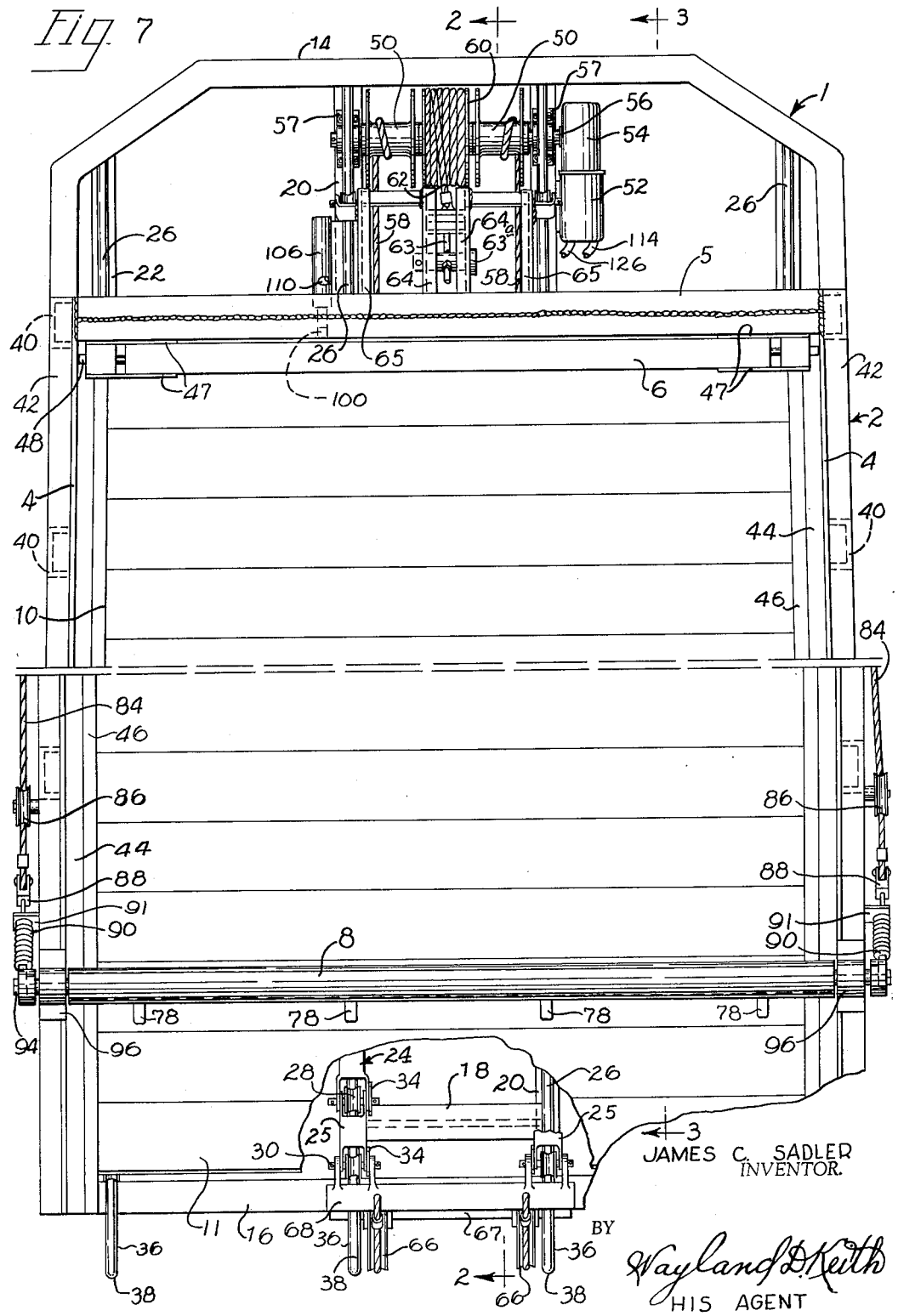
FIG. 7 is a top plan view of the vehicle, showing the body and ejector mechanism mounted thereon, with parts broken away and shortened to bring out the details of construction.

The floor 10 has outstanding lugs 78 on the plane face thereof, which lugs 78 fit against the lower side of rear end gate 8 when the body 2 is in load receiving position, as shown in FIGS. 1, 2, and 7. When the body is in this position the rear end gate is closed and is in relatively tight fitting relation with the floor and sides to prevent the loss of granular material therefrom, as is the forward end gate or push gate 6.

As the floor 10 is returned by the pull cable 62 winding onto the drum 60', from the position as shown in FIG. 3 to the position as shown in FIGS. 2 and 7, the forward end of the floor 10 engages upstanding abutments 80 which are slidably mounted on side frame members 12, each of which abutments is secured to a bar 82 to which a cable 84 is attached. The cables 84 pass outward through side frame member 12, as will best be seen in FIGS. 5 and 18, and beneath respective sheaves 86 to move the respective linkages 88 downward against tension of springs 90, which will move levers 92 from the position as indicated in FIG. 3 to the positions indicated in FIGS. 1 and 2, and since the rear end gate 8 is fixedly secured to shaft 94 to which lever 92 is fixedly secured, the shaft 94 is rotated by the pull on cables 84 to compress springs 90 against apertured lugs 91, which lugs are mounted on side walls 4 of body 2, to close the rear end gate 8 against the compressive force of springs 90, into the position as shown in FIG. 4, and then upon further forward movement of floor 10, the upstanding lugs or abutments 78 engage the lower side of the rear end gate 8 to prevent the yielding of this rear end gate, upon the loading of the body 2 with granular material. The shaft 94 is journaled within bearings 96 mounted on the upper face of channel member 42, with the bearings being of such height as to permit the rear end gate 8 to be moved to a height above the ejection level of the load.

The invention, as disclosed herein, shows winches 50 and a winch drum 60 mounted on a fixedly secured shaft 56, which shaft 56 is journaled in bearings 57 mounted on the lower side of track members 20, so upon rotation of the shaft 56 by a motor 52 and gear reduction unit 54, the shaft will simultaneously drive winches 50 and winch drum 60 in the same direction to move the floor 10 and the end or push gate 6 in one direction, within the limits as defined by stops 98 and 100 slidably mounted on the respective valves 106 and 108, which valves are mounted on one of the track members 20. The valves 106 and 108 actuate the respective slidable valve members 102 and 104 in the respective valves 106 and 108, as will best be seen in FIGS. 11, 12 and 13. The stop 98 is within a path of forward end gate or push gate 6, when it is moving toward the forward end of the haulage vehicle 1, and when the forward end gate or push gate 6 engages the stop 98, the slidable valve member 102 is moved until the passage thereof is in register with ports of conduit 110 and the port to which check valve 112 is connected. The conduit 110 connects by a T-connection 111 with conduit 114 leading from selector valve 116. The selector valve 116 has inlet and discharge conduits 118 and 120 connected thereto with a reservoir 122 supplying fluid through inlet conduit 118 to a hydraulic pump 124 for directing fluid from the reservoir 122 to the selector valve 116. Upon movement of plunger 117 of selector valve 116, the hydraulic fluid may be directed into conduit 114 to motor 52 and the hydraulic fluid returning through conduit 126 if the valves 102 and 104 are in the position as shown in FIG. 12. The valves 106 and 108 have springs 107 and 109 therein which normally urge valve members 102 and 104 outward to close the bypass valve when stops 98 and 100 are not being held in depressed condition by forward end gate or push gate 6 or the end of floor 10, as shown in FIGS. 11 and 13, respectively. A conduit 128 is connected to conduit 126 by a T-connection 130 and connected through valve 108 and check valve 132 to conduit 114. By having conduits 110 and 128, valves 106, 108, and check valves 112 and 132 arranged in the manner shown and described, the pump 124 will deliver hydraulic fluid into conduit 114, as shown in FIG. 11, thence to a hydraulic motor 52, and upon rotating the driven element therein, the hydraulic fluid will exhaust into conduit 126 and return into selector valve 116 and exhaust through discharge conduit 120 into reservoir 122. This will continue so long as the forward end or push gate 6 is not moved into engagement with stop 98, however, upon the forward end or push gate 6 moving into engagement with stop 98, the valve 102 will be moved against compression spring 107 until the ports of the valve 102 register with the port of conduit 110 and port of check valve 112, whereby the hydraulic fluid will by-pass from conduit 114 through conduit 110, valve 102, and through check valve 112 into conduit 126 and thence through selector valve 116 into discharge conduit 120, whereupon the hydraulic fluid will be exhausted into reservoir 122 and the forward end or push gate 6 and further movement will be arrested.

When it is desired to dump a load of granular material or the like, the plunger 117 of selector valve 116 is moved from the position as shown in FIG. 11 to the position as shown in FIG. 13, whereby the hydraulic fluid is directed from reservoir 122 through inlet conduit 118 into pump 124, thence into inlet conduit and into a port in the selector valve 116, and through passages within plunger 117 and will be directed outward through conduit 126, and with the valve 102 closing in the port in conduit 110, the hydraulic conduit 114 will move the movable floor 10 and the forward end or push gate 6 rearward until the load of granular material or the like is discharged from the rear of the vehicle haulage body 2. As the movement of the forward end or push gate starts, the abutment 80 and bar 82 will move rearward to lessen the tension on cable 84, whereby a spring 90 reacting against lug 91 will urge linkage 88 upward, which in turn will move lever 92 through an arc of approximately ninety degrees to lift the rear end gate 8 from the position as shown in FIG. 2 to the position as shown in FIG. 3, whereupon, the hydraulic motor 52 will drive the shaft 56 through gear reduction unit 54 and the winches 50 will exert a pull on cables 58 to move the forward end gate or push gate 6 rearward with the roller chain 24, which supports the floor 10, moving along track members 20 and 22 and around arcuate tracks 38, and with the rollers 70 and 72 supporting the floor 10 after the floor 10 has passed around arcuate track 38, whereupon the continued pull of cables 58 will move the normally rear end portion of floor 10 into contact relation with stop 100, which will move the valve 104 from the position as shown in FIG. 12 to the position as shown in FIG. 13, whereupon, the hydraulic fluid will be by-passed through T-connection 130, conduit 128, and check valve 132 into conduit 114 to return through selector valve 116 and discharge conduit 120 to reservoir 122. The movement of the floor 10 is then arrested and will remain in arrested position until the selector valve 116 is reset. At the same time the cables 58 are moving the floor 10 rearward, the winch 60 is paying out cable 62 in the manner as shown in FIG. 3.

The forward end or push gate 6 has downwardly extending brace members 65, on which are mounted rollers 28 for rolling on track members 20. The braces 65 are connected in cross-braced relation with frame 64 so as to hold the forward end or push gate 6 in rigid, guided relation.

The channel members 42, on the top of the respective side walls 4, are held in transverse braced relation by a box channel 5 which is secured to the channel members 42, as by welding. The box channel 5 also serves as a positive forward stop for forward end or push gate 6, thereby relieving the forward end or push gate 6 of strain, when a load of granular material is being hauled, which material will tend to press outward both on the sides of the vehicle body and on the end gates thereof.

It is preferable to have a thin film of rubber bonded to the convex side of arcuate sealing member 32 so as to be in wiping relation with the concave surface 11a and 11b of floor sections 11, so as to prevent leakage of material therethrough and also to minimize abrasion by granular material. The outstanding lugs 34 have tangs 34a on each side thereof so as to center the arcuate sealing member 32 as the floor sections 11 move around the arcuate track, as will best be seen in FIG. 16; however, at no time will these tangs permit rotation of the arcuate sealing member 32 a sufficient arcuate distance to uncover the longitudinal crack which extends between floor sections 11. This arrangement enables a substantially plane floor surface to be had within the load receiving compartment of the haulage vehicle 1.

It is preferable to have an elongated, angulated conduit 134 extending diagonally through each of the side frame members 12 so as to guide the respective cables 84 from the respective pulleys 86 into substantially straight alignment with the end of slide bar 82 which is slidably mounted in bearings 136. In this manner each cable 84 can operate the respective levers 92 exterior of the respective side frame members 12 by the bar 82 and the abutment 80 thereon, which bar and abutment are within the confines of side frame members 12 near the forward end of the vehicle 1.

I claim:
1. A vehicle haulage device comprising in combination;
   a wheeled frame,
   a pair of longitudinally spaced apart sides mounted on said wheeled frame,
   more than two longitudinal, spaced apart, parallel tracks mounted on said wheeled frame at spaced intervals,
   roller elements mounted on said tracks, which roller elements are spaced apart transversely and longitudinally,
   interconnecting links, which form reaches of chain, one reach of chain being associated with each longitudinal track, the links of which chain are mounted on said rollers,
   transverse floor sections, each having a plane upper surface, mounted on said links and having the edges thereof fitted in relatively close relation,
   each transverse floor section having, on the opposed longitudinal edge portions, opposed concave, arcuate under surfaces,
   an independent complementary convex, arcuate sealing member mounted on said reaches of chain over the transverse, spaced apart roller elements to form a seal between the opposed arcuate, concave under surfaces of the respective floor sections,
   pull means connected to an end of said chain to move said chain in one direction, and
   further pull means connected to the opposite end of said chain to move said chain in the opposite direction.
2. A vehicle haulage device as defined in claim 1, wherein:
   said spaced apart upright sides diverge rearwardly, and wherein a push gate member is mounted on said rollers on said track and fixedly secured to said transverse floor sections.
3. A vehicle haulage device as defined in claim 2, wherein:
   said push gate has a yieldable portion on each side thereof,
   with resilient means urging said yieldable end of said push gate into contact relation with said respective sides.
4. A vehicle haulage device as defined in claim 3, wherein:
   the lower edge of each of said sides extends inwardly and downwardly.
5. A vehicle haulage device as defined in claim 1, wherein:
   an end gate is pivotally mounted on said upstanding sides near the rear end thereof,
   cable means is connected to said end gate, means associated with said cable means and with said floor sec- tions to move said end gate in one direction in response to the movement of said transverse floor sections in one direction.

6. A vehicle haulage device as defined in claim 5, wherein:
one of said transverse floor sections has upstanding lugs on the face thereof,
said lugs being engageable with the lower exterior side of said rear end gate to hold said end gate in closed position when said transverse floor sections move to a predetermined forward position.

7. A vehicle haulage device as defined in claim 5, wherein:
said cable means has an outstanding abutment thereon on the end thereof adjacent said transverse floor sections, the forward end of said transverse floor sections being adapted to engage said outstanding abutment on said cable means when said floor sections are moved in one direction to urge the rear end gate into closed position and the movement of said floor sections in the opposite direction moves out of engagement with said outstanding abutment on said cable means to release said end gate for movement into an open position.

8. A vehicle haulage device as defined in claim 1, wherein:
a spring associated with said end gate to normally urge said end gate into open position,
means is provided to urge said end gate into closed position against the resilient action of said spring upon movement of said transverse floor sections in one direction,
which end gate is urged in the opposite direction by the resilient action of said spring when said transverse floor members are moved in the opposite direction.

9. A vehicle haulage device comprising in combination;
a wheeled frame,
a pair of longitudinal, spaced apart side frames mounted on said wheeled frame,
longitudinal, spaced apart, parallel tracks mounted on said wheeled frame,
roller elements mounted on said tracks, which roller elements are spaced apart longitudinally,
interconnecting links pivotally joined together by axle pins, to form reaches of chain,
rollers mounted on said axle pins,
apertured, arcuate lugs mounted on said axle pins,
transverse floor sections mounted on said links and having the edges thereof fitted in relatively close relation,
an elongated, arcuate bar, substantially the length of said transverse floor sections,
said elongated, arcuate bar having a plurality of said arcuate lugs secured thereto, with the apertures thereof being in axially aligned relation,
said tranverse floor sections having concave sides thereon to complementally receive said arcuate bar in close fitting relation so as to close the opening between adjacent floor sections when said transverse floor sections are positioned in an angulated position with respect to each other,
pull means connected to an end of at least one reach of said chain to move said reach of chain in one direction, and
further pull means connected to the opposite end of said reach of chain to move said reach of chain in the opposite direction.

10. A vehicle haulage device comprising in combination;
a wheeled frame,
a pair of longitudinal, spaced apart sides mounted on said wheeled frame,
longitudinal, spaced apart, parallel tracks mounted on said wheeled frame,
roller elements mounted on said tracks, which roller elements are spaced apart longitudinally,
interconnecting links mounted on said roller elements and forming a chain,
transverse floor sections mounted on said links and having the edges fitted in relatively close relation,
winch means mounted on the forward end of said wheeled frame,
motor means connected in driving relation with said winch means,
at least a pair of cables wound on said winch means in opposite directions
one of said cables being connected to one end of said transverse floor sections and the other end of said cable having means connecting the cable to the other end of said transverse floor sections,
motor control means for selectively operating said motor to wind one of said cables onto said winch means while the other of said cables is unwinding from said winch means, and
further control means for winding said last mentioned cable onto said winch means, while said first mentioned cable is being unwound from said winch means.

11. A vehicle haulage device as defined in claim 10, wherein:
limit means is mounted on said wheeled frame,
means connected with said limit means for limiting the movement of said transverse floor sections in either direction.

12. A vehicle haulage device as defined in claim 11, wherein:
said motor means is a hydraulic motor, and wherein
said limit means is valves operated by the engagement of said transverse floor sections with said limit means being in contact relation with said transverse floor sections at the extremity of movement in either direction, and
conduit means connecting a source of hydraulic power with said valves and said motor to form a hydraulic system.

13. A vehicle haulage device as defined in claim 1, wherein:
said longitudinal spaced apart parallel track members, each track member having a convex, arcuate upper surface, and wherein
said roller members secured to the lower side of said transverse floor sections have a complementary concave face so as to form a complementary roller and track combination.

14. A vehicle haulage device comprising in combination:
a wheeled frame,
a pair of longitudinally spaced apart sides mounted on said wheeled frame,
longitudinal spaced apart parallel tracks mounted on said frame,
roller elements mounted on said tracks, which roller elements are spaced apart longitudinally,
interconnecting links mounted on said rollers,
transverse floor sections mounted on said links and having the edges thereof fitted in relatively close relation,
an axle journaled on the forward end of said wheeled frame,
three winch drums mounted on and fixedly secured to said axle in end-to-end relation, which winch drums are rotatable in unison,
a motor connected in driving relation with said winch drums,
cables wound on said respective winch drums, two of which cables are wound in the same direction and the other of which cables is wound in the opposite direction, sheaves mounted on said wheeled frame, two of said cables passing over sheaves and being interconnected with the lengths mounted on said rollers, the other of said cables being interconnected with said transverse floor sections at the opposite end of said wheeled frame to enable the unwinding of said cable as the other cables are being wound onto said winch drums.

References Cited by the Examiner

UNITED STATES PATENTS

| | | | |
|---|---|---|---|
| 1,038,230 | 9/1912 | Tansill | 214—83.22 X |
| 1,969,736 | 8/1934 | Erling | 91—400 |
| 2,119,424 | 5/1938 | Douglas et al. | 214—83.34 X |
| 2,304,634 | 12/1942 | Ernst | 91—400 |
| 2,454,101 | 11/1948 | Snead | 214—83.22 |
| 2,679,941 | 6/1954 | Roesies | 214—83.22 |
| 3,151,784 | 10/1964 | Tailor | 214—17.68 X |

GERALD M. FORLENZA, *Primary Examiner.*

HUGO O. SCHULZ, *Examiner.*

R. G. SHERIDAN, *Assistant Examiner.*